(12) United States Patent
Kimura et al.

(10) Patent No.: US 6,618,515 B2
(45) Date of Patent: Sep. 9, 2003

(54) CONNECTOR WITH A CONNECTION DETECTION FUNCTION, OPTICAL FIBER CABLE WITH A CONNECTION DETECTION FUNCTION, AND EQUIPMENT CONTROL MECHANISM FOR AN OPTICAL EQUIPMENT

(75) Inventors: Koji Kimura, Hyogo (JP); Takeshi Satake, Hyogo (JP); Koichi Maeda, Osaka (JP)

(73) Assignee: Mitsubishi Cable Industries, Ltd., Hyogo (JP)

( * ) Notice: Subject to any disclaimer, the term of this patent is extended or adjusted under 35 U.S.C. 154(b) by 0 days.

(21) Appl. No.: 09/885,541

(22) Filed: Jun. 21, 2001

(65) Prior Publication Data

US 2002/0159715 A1 Oct. 31, 2002

(30) Foreign Application Priority Data

Jun. 21, 2000 (JP) ..................... P. 2000-185637
Sep. 28, 2000 (JP) ..................... P. 2000-297234

(51) Int. Cl.[7] ................................. G02B 6/26
(52) U.S. Cl. ........................... 385/15; 439/489
(58) Field of Search ................. 385/15, 16, 53, 385/88, 92, 101, 139; 439/188, 489; 200/51.09, 51.1

(56) References Cited

U.S. PATENT DOCUMENTS

| | | | | |
|---|---|---|---|---|
| 2,034,273 A | * | 3/1936 | Smith | 340/656 |
| 3,944,316 A | * | 3/1976 | Newman et al. | 439/181 |
| 4,971,569 A | * | 11/1990 | Gooch et al. | 439/188 |
| 5,444,810 A | * | 8/1995 | Szegda | 385/139 |
| 5,727,675 A | * | 3/1998 | Leveque et al. | 200/524 |
| 5,904,578 A | * | 5/1999 | Kubota et al. | 439/63 |
| 5,921,793 A | * | 7/1999 | Phillips | 439/188 |
| 6,139,344 A | * | 10/2000 | Wang | 439/188 |
| 6,224,407 B1 | * | 5/2001 | Duquerroy et al. | 439/188 |

FOREIGN PATENT DOCUMENTS

JP 9-90165 4/1997

* cited by examiner

*Primary Examiner*—Lynn Feild
*Assistant Examiner*—Thanh-Tam Le
(74) *Attorney, Agent, or Firm*—Sughrue Mion, PLLC

(57) ABSTRACT

An optical connector 10 includes slide pins 16a and 16b, held for movement in a direction of an axis of the optical connector 10, and a proximity switch 21 whose conducting state can be switched in response to the movement of the slide pins. Only when the optical connector 10 is properly connected to an optical receptacle 11, the proximity switch 21 is turned into the conducting state.

26 Claims, 12 Drawing Sheets

CONNECTOR WITH A CONNECTION DETECTION FUNCTION, OPTICAL FIBER CABLE WITH A CONNECTION DETECTION FUNCTION, AND EQUIPMENT CONTROL MECHANISM FOR AN OPTICAL EQUIPMENT

BACKGROUND OF THE INVENTION

This invention relates to a connector and an optical fiber cable each having a function by which when a connector provided at a cable end is improperly connected to a receptacle, this connected condition can be detected. This invention also relates to an equipment control mechanism for an optical equipment connected to a connector, by which when the connector provided at a cable end is improperly connected to a receptacle, the operating condition of the equipment is controlled in accordance with this detection result.

In recent years, optical fibers have been used in many fields. For example, in the information communication field, the use of optical fibers as communication media has become the mainstream of optical communication. In the field of machine tools, laser beam machines have been extensively used for cutting, welding and so on, and an optical fiber has been used as means for transferring this laser beam.

In the case of optical communication, for connecting a light source or an equipment, such as an optical transceiver and an optical measuring instrument, to an optical fiber, an optical receptacle, provided at an optical input/output portion of the equipment, is coupled and connected to an optical connector provided at an end of the optical fiber. In the case of a laser beam machine, similarly, an optical receptacle, provided at a laser beam source or an emitting optical system or the like for radiating a laser beam toward an object to be machined, is coupled and connected to an optical connector provided at an end of an optical fiber.

However, unless the optical receptacle and the optical connector are securely connected together, signals can not be properly transmitted and received in the case of the optical communication. In the case of the laser beam machine, as a laser beam has a high output, when the guidance of the laser beam is effected in a condition in which the connection is not securely made, or when the connector is disconnected during the guidance of the laser beam, there are fears that this leads to damage to the end surface of the optical fiber and a peripheral equipment, such as the connector, or to an accident which puts the nearby workers and objects in danger because of leakage of the laser beam. The only means for preventing such troubles was to confirm the condition of connection between the optical receptacle and the optical connector with the eyes or the touch. If this confirmation operation should be forgotten, this would lead to the possibility that the above troubles occur.

Therefore, in order to solve the above problems and to secure the safety, there is provided the following connection detection mechanism capable of detecting the secure connection between an optical connector and an optical receptacle.

FIG. 16 shows the construction of a connector connection detection mechanism disclosed in Japanese Patent Unexamined Publication No. Hei. 9-90165. A laser diode 2 for emitting a laser beam is provided within a laser oscillator 1. An optical receptacle 3 is mounted on a panel of the laser oscillator 1, and is coupled to the laser diode 2 by an optical fiber 4.

FIG. 17 is a cross-sectional view of the above connector connection detection mechanism. The optical receptacle 3 is fixedly secured to the panel 1a of the laser oscillator 1 through a flange 3a formed on this optical receptacle 3. A sleeve 3c is formed on an optical connector-connecting side of the optical receptacle 3, and a ferrule 5 is held in the sleeve 3c, so as to move in a direction of the axis of the optical receptacle 3. The optical fiber 4 is connected to a laser oscillator-side end of the ferrule 5, and a proximity switch 6 is provided at an end of the optical fiber 4 through an arm 6a. A sensing member 3b is provided at a laser oscillator-side end of the optical receptacle 3, and when the proximity switch 6 is brought into contact with the sensing member 3b, this proximity switch is turned into a conducting state. The ferrule 5 is normally urged toward a distal end of the sleeve 3c by a compression coil spring (urging means) 7, and is kept stationary in a position where the proximity switch 6 contacts the sensing member 3b.

Then, when an optical connector 9 provided at an end of an optical fiber 8 is connected to the optical receptacle 3, the ferrule 5 held within the optical receptacle 3 is pushed by a ferrule 9a of the optical connector 9, as shown in FIG. 18. Thus, the proximity switch 6 is moving apart from the sensing member 3b, and is turned into a non-conducting state.

As described above, when the proximity switch 6 is turned into the non-conducting state, the laser diode 2 can emit a laser beam under the control of a control circuit (not shown). In contrast, when this switch is in the conducting state, the switch is unable to emit a laser beam. Therefore, as long as the optical connector is not connected to the optical receptacle, the laser beam can be prevented from being accidentally emitted.

However, when the above connector connection detection mechanism is to be introduced as facilities, it is difficult to add this detection mechanism to an already-installed equipment. Therefore it is necessary to introduce a new equipment beforehand provided with the detection mechanism, and this is very wasteful from the viewpoint of the cost Alternatively, there may be proposed a method of adding the above detection mechanism to an existing equipment. In this case, however, the equipment need to be extensively modified, and this is also very difficult.

SUMMARY OF THE INVENTION

This invention seeks to solve the above problems, and it is an object of the invention to provide a connector with a connection detection function and an optical cable with a connection detection function, which enables a connector connection detection mechanism to be easily provided on already-installed optical equipments. It is another object of the invention to provide an equipment control mechanism for an optical equipment.

The above-mentioned object can be achieved by, according to a first aspect of the present invention, a connector with a connection detection function, the connector being adapted to be connected to a fixed receptacle and comprising:

a body on which a longitudinally extending member is mounted;

a moving member movable in an axial direction of the connector relative to the body; and a switch that can be changed between an electrical conducting state and an electrical non-conducting state in response to the movement of the moving member when the connector is properly fitted onto the fixed receptacle, to thereby detect a proper connection between the connector and the fixed receptacle.

In the above-mentioned structure, it is preferable that the longitudinally extending member comprises a cable.

Further, in the above-mentioned structure, it is more preferable that the longitudinally extending member comprises a optical fiber cable.

In the connector, it is preferable that the switch is electrically Insulated from the fixed receptacle when the connector comes into contact with the fixed receptacle.

Further, in the connector, it is preferable that the switch is changed from the electrical non-conducting state to the electrical conducting state only when the connector is properly fitted to the fixed receptacle.

Also, the switch may be changed from the electrical conducting state to an electrical non-conducting state only when the connector is properly fitted to the fixed receptacle.

Moreover, in the above-mentioned connector, it is preferable that the switch comprises;

a contact portion having a positive contact and a negative contact; and a conductor piece movable relative to the contact portion, wherein the contact portion and the conductor piece are brought in contact with each other by the movement of the moving member when the connector is properly fitted to the fixed receptacle.

In the present invention, the conductor piece may be a coil spring.

In the above-mentioned connector, it is advantageous that the switch comprises a proximity switch.

Here, the proximity switch means a device, the conducting state of which is switched when the distal end of the device comes into contact with some object, or when the device reacts to the proximity of an actuating means without physical contact therewith. For example, known proximity switches, such as a high-frequency Induction proximity switch (which operates in response to change in the magnetic field) and an electrical capacitance-type proximity switch, can be used as the proximity switch.

In the connector with the connection detection function of the above construction, the connection detection function is provided not at the fixed receptacle but at the portable connector. Therefore the connector connection detection function can be added, using a receptacle provided at an existing equipment not provided with a detection function.

The above-mentioned object can be also achieved by, according to a second aspect of the present invention, an optical fiber cable with a connection detection function comprising:

a pair of connectors mounted on opposite ends of an optical fiber and adapted to be connected to respective fixed receptacles, each of the connectors including,
  a body on which the optical fiber is mounted,
  a moving member movable in an axial direction of the connector relative to the body, and
  a switch that can be changed between an electrical conducting state and an electrical non-conducting state in response to the movement of the moving member when the connector is properly fitted onto the fixed receptacle; and a loop-shaped electric wiring extended along the optical fiber through the connectors, wherein the loop-shaped electric wiring is normally maintained in a non-conducting state, further the loop-shaped electric wiring is changed from the non-conducting state to a conducting state when both of the connectors are properly connected to the respective fixed receptacles.

The above-mentioned optical fiber cable, may further comprises:

a conduction confirmation member for confirming the conducting and non-conducting states of the loop-shaped electric wiring.

Here, examples of the conduction confirmation member include a light emitting device which becomes luminous, and a device which produces a sound, in the conducting state of the electric wiring.

In addition, the above-mentioned optical fiber cable may further comprises:

an outputting member for outputting information regarding the conducting and non-conducting states of the loop-shaped electric wiring.

Here, the outputting member is, for example, device which measures a current and a voltage, and detects a resistance value in the electric wiring.

Further, the above-mentioned object can be achieved by an optical fiber cable with a connection detection function, according to a third aspect of the present invention, comprising:

a pair of connectors mounted on opposite ends of an optical fiber and adapted to be connected to a pair of fixed receptacles respectively, each of the connectors including,
  a body on which the optical fiber is mounted,
  a moving member movable in an axial direction of the connector relative to the body, and
  a switch that can be changed between an electrical conducting state and an electrical non-conducting state in response to the movement of the moving member when the connector is properly fitted onto the fixed receptacle; and a loop-shaped electric wiring extended along the optical fiber through the connectors, wherein the loop-shaped electric wiring is normally maintained in a conducting state, further the loop-shaped electric wiring is changed from the conducting state to a non-conducting state when both of the connectors are properly connected to the respective fixed receptacles.

The above-mentioned optical fiber cable, may further comprises:

a conduction confirmation member for confirming the conducting and non-conducting states of the loop-shaped electric wiring.

In addition, the above-mentioned optical fiber cable may further comprises:

an outputting member for outputting information regarding the conducting and non-conducting states of the loop-shaped electric wiring.

The above-mentioned object can be also achieved by an optical fiber cable with a connection detection function, according to a fourth aspect of the present invention, comprising:

a first connector mounted on one end of an optical fiber and adapted to be connected to a first receptacle;

a second connector mounted on the other end of the optical fiber and adapted to be connected to a second receptacle;

a first loop-shaped electric wiring normally maintained in a conducting state and having a detector;

a second loop-shaped electric wiring extended through the first connector and normally maintained in a non-conducting state, the second loop-shaped electric wiring being electrically connected in parallel with the first loop-shaped electric wiring; and a third loop-shaped electric wiring extended through the second connector and normally maintained in a non-conducting state, the third loop-shaped electric wiring being electrically connected in parallel with the first loop-shaped electric wiring, wherein when the first connector is properly connected to the first receptacle, the second loop-shaped electric wiring is changed from the non-conducting state to a conducting state so as to be detected by the detector, and when the second connector is properly connected to the second receptacle, the third loop-shaped electric wiring is changed from the non-conducting state to a conducting state so as to be detected by the detector.

In the above-mentioned optical fiber cable, it is preferable that an outputting member is provided at the first electric wiring for outputting information regarding the conducting and non-conducting states of the second and third electric wirings.

Further, in the above-mentioned optical fiber cable, it is preferable that the second electric wiring and the third electric wiring are different in resistance value from each other.

The above-mentioned object can be achieved by, according to a fifth aspect of the present invention, an optical fiber cable with a connection detection function comprising:

a first connector mounted on one end of an optical fiber and adapted to be connected to a first receptacle;

a second connector mounted on the other end of the optical fiber and adapted to be connected to a second receptacle;

a first loop-shaped electric wiring normally maintained in a conducting state and including a detector;

a second loop-shaped electric wiring extended through the first connector and normally maintained in a conducting state, the second loop-shaped electric wiring being electrically connected in parallel with the first loop-shaped electric wiring; and a third loop-shaped electric wiring extended through the second connector and normally maintained in a conducting state, the third loop-shaped electric wiring being electrically connected in parallel with the first loop-shaped electric wiring, wherein when the first connector is properly connected to the first receptacle, the second loop-shaped electric wiring is changed from the conducting state to a non-conducting state so as to be detected by the detector, and when the second connector is properly connected to the second receptacle, the third loop-shaped electric wiring is changed from the conducting state to a non-conducting state so as to be detected by the detector.

In the above-mentioned optical fiber cable, it is preferable to further comprises:

an outputting member, provided at the first electric wiring, for outputting information regarding the conducting and non-conducting states of the second and third electric wirings.

In addition, in the above-mentioned optical fiber cable, it is preferable that the second electric wiring and the third electric wiring are different in resistance value from each other.

In the optical fiber cable with the connection detection function of the above construction, the connection detection function Is not fixedly provided at an equipment, but is provided at the optical fiber cable releasably connectable to this equipment. Therefore, the connector connection detection function can be added, using the existing equipment not provided with a detection function.

And besides, the resistance value of the second electric wiring is different from that of the third electric wiring, and therefore whether or not the connectors, provided respectively at the opposite ends, have been properly connected, is outputted as the conducting and non-conducting information from the outputting member. Namely, when the distance between the outputting member and the connector operatively connected to the second electric wiring, is equal to the distance between the outputting member and the connector operatively connected to the third electric wiring, and the resistance values of the second and third electric wirings are different from each other, then it can be confirmed from the conducting and non-conducting information (resistance value), outputted from the outputting member, which of connectors is incompletely connected.

When the distance between the outputting member and the connector operatively connected to the second electric wiring, is different from the distance between the outputting member and the connector operatively connected to the third electric wiring, and the resistance values of the second and third electric wirings are equal to each other, then it can be confirmed from the conducting and non-conducting information (resistance value), outputted from the outputting member, which of connectors is incompletely connected. Further, when at least the second and third electric wirings are respectively provided with different resistances, if the values of the resistances are large enough to ignore the resistance values of the electric wirings, it can be confirmed without depending on the resistance value or length of the electric wiring, from the conducting and non-conducting information (resistance value), outputted from the outputting member, which of connectors is incompletely connected.

The above-mentioned another object can be achieved by, according to a sixth aspect of the present invention, an equipment control mechanism for an optical equipment comprising:

an optical fiber cable as defined in one of the second and third aspect of the present invention;

an outputting member provided at the loop-shaped electric wiring for outputting information regarding the conducting and non-conducting of the loop-shaped electric wiring; and a controller that controls an operation of an optical equipment, which has one of the fixed receptacle which is connected to one of the connectors, in accordance with the information outputted from the outputting member.

In the equipment control mechanism, it is preferable that the optical equipment is a laser oscillator, and when an incompletely-connected condition of the connector is detected from the conducting and non-conducting information outputted from the outputting member, the laser oscillator is prevented from emitting a laser beam.

Further, in the above-mentioned equipment control mechanism, it is preferable that the optical equipment is a laser oscillator, and when an incompletely-connected condition of the connector is detected from the conducing and non-conducting information outputted from the outputting member, the operation of the laser oscillator is stopped.

Further, the above-mentioned another object can be achieved by an equipment control mechanism for an optical equipment, according to a seventh aspect of the present invention, comprising:

an optical fiber cable as defined in one of the fourth and fifth aspect of the present invention;

an outputting member, provided at the first loop-shaped electric wiring, for outputting information regarding the conducting and non-conducting states of the second and third electric wirings; and a controller that controls an operation of an optical equipment, which has one the fixed receptacle which is connected to the connector, in accordance with the information outputted from the outputting member.

In the equipment control mechanism, it is preferable that the optical equipment is a laser oscillator, and when an incompletely-connected condition of the connector is detected from the conducing and non-conducting information outputted from the outputting member, the laser oscillator is prevented from emitting a laser beam.

Further, in the above-mentioned equipment control mechanism, it is preferable that the optical equipment is a laser oscillator, and when an incompletely-connected condition of the connector is detected from the conducing and non-conducting information outputted from the outputting member, the operation of the laser oscillator is stopped.

In the equipment control mechanism of the above construction, the connected condition of the connector provided at the end of the optical fiber cable to the equipment can be detected, and the operation of the equipment, to which the optical fiber cable is connected, can be controlled on the basis of the detection results.

DETAILED DESCRIPTION OF THE PREFERRED EMBODIMENTS

Figure 1:
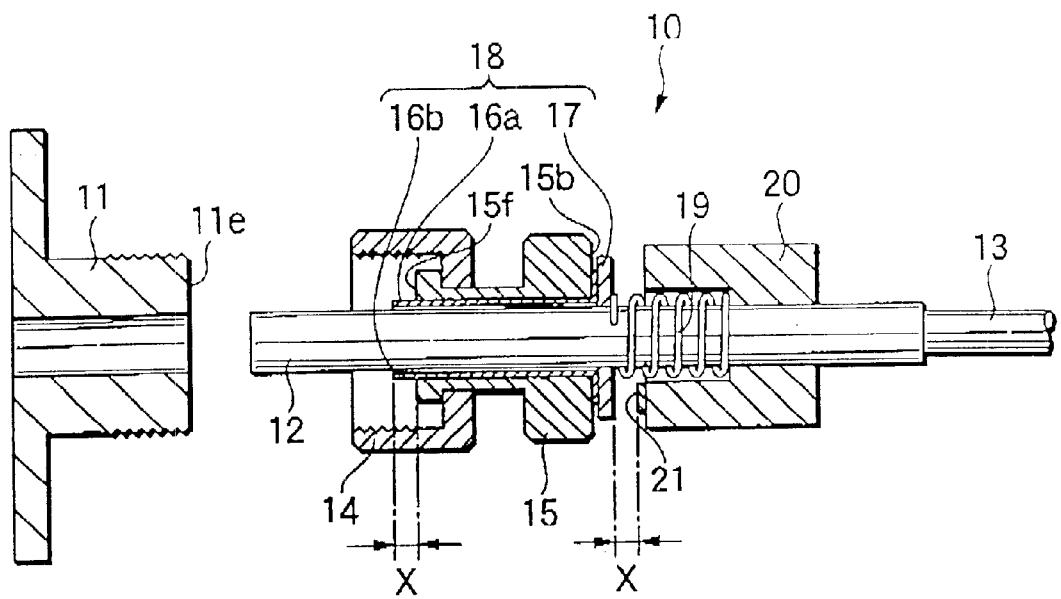
FIG. 1 is a cross-sectional view of a connector with connection detection function according to a first embodiment of the present invention.

The present invention will now be described with reference to the drawings. FIG. 1 shows a connector with a connection detection function according to a first embodiment of the invention. Reference numeral 10 denotes an optical connector with the connection detection function used for a laser beam-transferring optical fiber. Reference numeral 11 denotes an optical receptacle provided at an equipment, that is, a laser oscillator.

An optical fiber 13 is inserted in a ferrule 12 along an axis thereof, and an end portion of this optical fiber 13 is held by this ferrule. A nut 14 serves to fix the optical connector 10 to the optical receptacle 11. A nut retaining member 15 is fixedly mounted on the outer periphery of the ferrule 12. The nut 14 is held on the nut retaining member 15, so as to move in a direction of the axis of the optical connector 10 and also to rotate about this axis.

Slide pins 16a and 16b are held in a gap between the ferrule 12 and the nut retaining member 15 so as to move in the direction of the axis of the optical connector 10. A sensing member 17 of an annular shape is mounted around the outer periphery of the ferrule 12. The sensing member 17 is fixedly secured to proximal ends of the slide pins 16a and 16b, and is movable in the direction of the axis, of the optical connector 10 together with these slide pins 16a and 16b. In this embodiment, the slide pins 16a and 16b and the sensing member 17 jointly form a moving member 18 of the invention.

In the above construction, when the moving member 18 abuts against a proximal end surface 15b of the nut retaining member 15, the distal end portions of the slide pins 16a and 16b project a predetermined distance X from a distal end surface 15f of the nut retaining member 15.

Reference numeral 19 denotes a coil spring, reference numeral 20 a spring retaining member of an annular shape, and reference numeral 21 a proximity switch mounted on a distal end of the spring retaining member 20. Here, the proximity switch 21 is switched from the non-conducting state to the conducting state (for example, through the movement of its internal components and so on) when a distal end of the proximity switch comes into contact with some object. The spring retaining member 20 is fixedly secured to the ferrule 12 in such a manner that when the moving member 18 abuts against the proximal end surface 15b of the nut retaining member 15, the sensing member 17 is spaced the above predetermined distance X from the proximity switch 21. The coil spring 19 is wound on the outer peripheral surface of the ferrule 12 between the sensing member 17 and the spring retaining member 20. This coil spring 19 is held by the spring retaining member 20 such that this coil spring 19 normally urges the sensing member 17 toward the distal end of the optical connector 10 to space the sensing member 17 apart from the proximity switch 21. In the above construction, the coil spring 19 may not normally urge the sensing member 17 toward the distal end of the optical connector 10 in so far as the sensing member 17 and the proximity switch 21 are normally spaced apart from each other.

Figure 2:
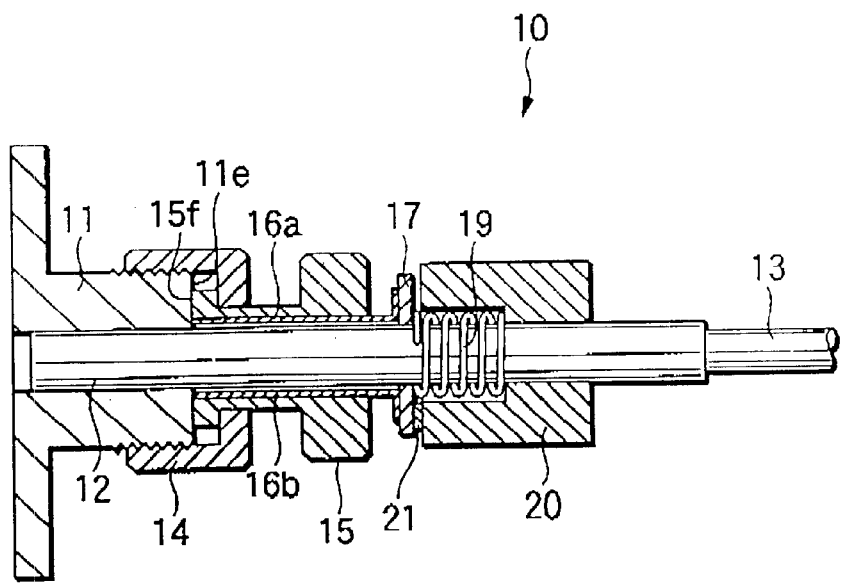
FIG. 2 is a view showing a condition in which the connector of the first embodiment is connected to a receptacle.

FIG. 2 shows a condition in which the optical connector 10 is properly connected to the optical receptacle 11.

When the optical connector 10 is fitted into the optical receptacle 11, the distal ends of the slide pins 16a and 16b abut against a distal end surface 11e of the optical receptacle 11, so that the sensing member 17 is moved toward the proximity switch 21. When this fitting operation further proceeds, so that the optical connector 10 and the optical receptacle 11 are brought into an allowable range of the properly-connected condition, the sensing member 17 comes into contact with the proximity switch 21, so that this proximity switch 21 is turned into the conducting state. When the proximity switch 21 is thus turned into the conducting state, a lamp (not shown), associated with this switch, is lighted, and therefore the fact that the optical connector 10 has been properly connected to the optical receptacle 11 can be detected. Then, in this condition in which the optical connector 10 is properly connected to the optical receptacle 11, the nut 14 is securely tightened relative to the optical receptacle 11, and by doing so, the displacement and withdrawal of the optical connector are prevented, so that the properly-connected condition can be maintained.

Figure 3:
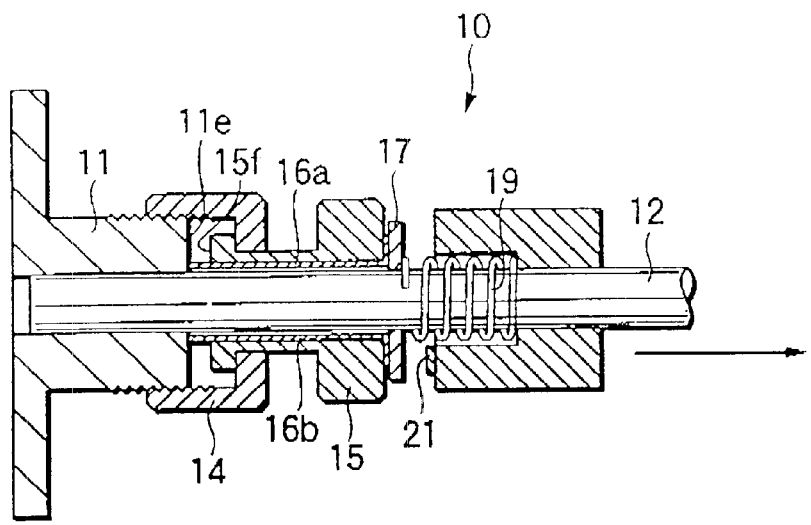
FIG. 3 is a view showing a condition in which the connector of the first embodiment is insufficiently connected to the receptacle.
Figure 4:
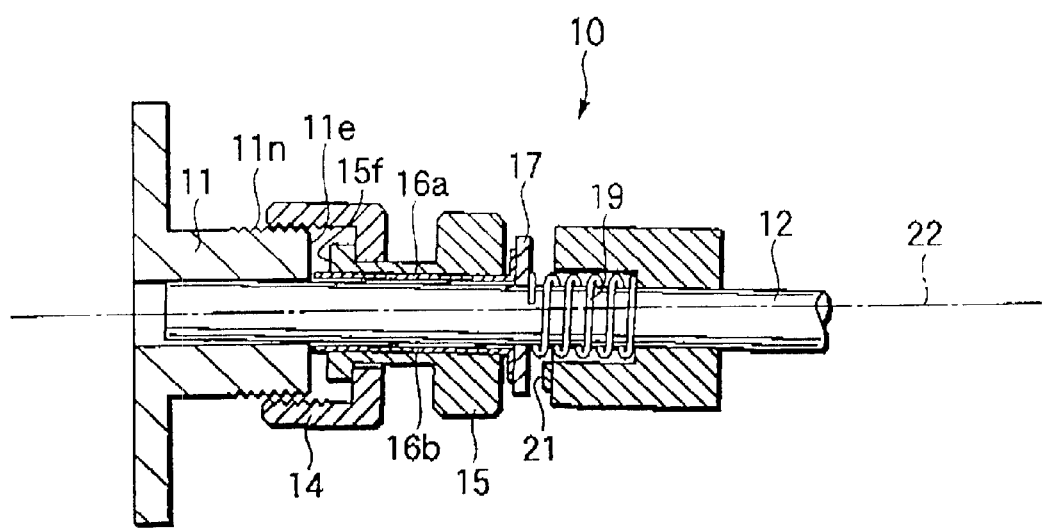
FIG. 4 is a view showing a condition in which the connector of the first embodiment is insufficiently connected to the receptacle in a manner different from that of FIG. 3.

FIGS. 3 and 4 show a condition in which the optical connector 10 is not properly connected to the optical receptacle 11, FIG. 3 shows a condition in which the nut 14 is not sufficiently tightened relative to the optical receptacle 11. In this case, when a force acts on the ferrule 12 to withdraw the same from the optical receptacle 11 in a direction indicated by an arrow (FIG. 3), a gap is formed between the distal end surface 11e of the optical receptacle 11 and the distal end surface 15f of the nut retaining member 15 by this pulling force. As a result, a gap is formed between the sensing member 17 urged toward the nut retaining member 15 by the coil spring 19, and the proximity switch 21, so that the sensing member 17 and the proximity switch 21 are out of contact with each other.

FIG. 4 shows a condition in which the optical connector 10 is not fitted straight relative to a central axis 22 of the optical receptacle 11, and the nut 14 is caught by a threaded portion 11n of the optical receptacle 11. Thus the nut 14 fails to be fully tightened relative to the optical receptacle 11, and therefore is (disposed short of the fully-tightened position.

In this case, also, a gap is formed between the distal end surface 11e of the optical receptacle 11 and the distal end surface 15f of the nut retaining member 15 as described; above, and as a result the sensing member 17 end the proximity switch 21 are disposed out of contact with each other.

In such a case, the proximity switch is not turned into the conducting state, and therefore the lamp, associated with this switch, is not lighted Thus the fact that the connection of the optical connector 10 to the optical receptacle 11 is insufficient can be detected.

The optical connector with the connection detection function of this embodiment, described above, is merely one example, and can be designed in accordance with various configurations of optical receptacles. Further, although the lamp is used as means for confirming the conducting state or the non-conducting state, a warming sound or a display, etc., which can confirm the conducting state or non-conducting state, ca be used. Although the above embodiment is directed to the optical connector for use with the optical fiber cable containing the laser beam-transferring optical fiber, the connector with the connection detection function of the invention can be used for a metal cable.

Figure 5:
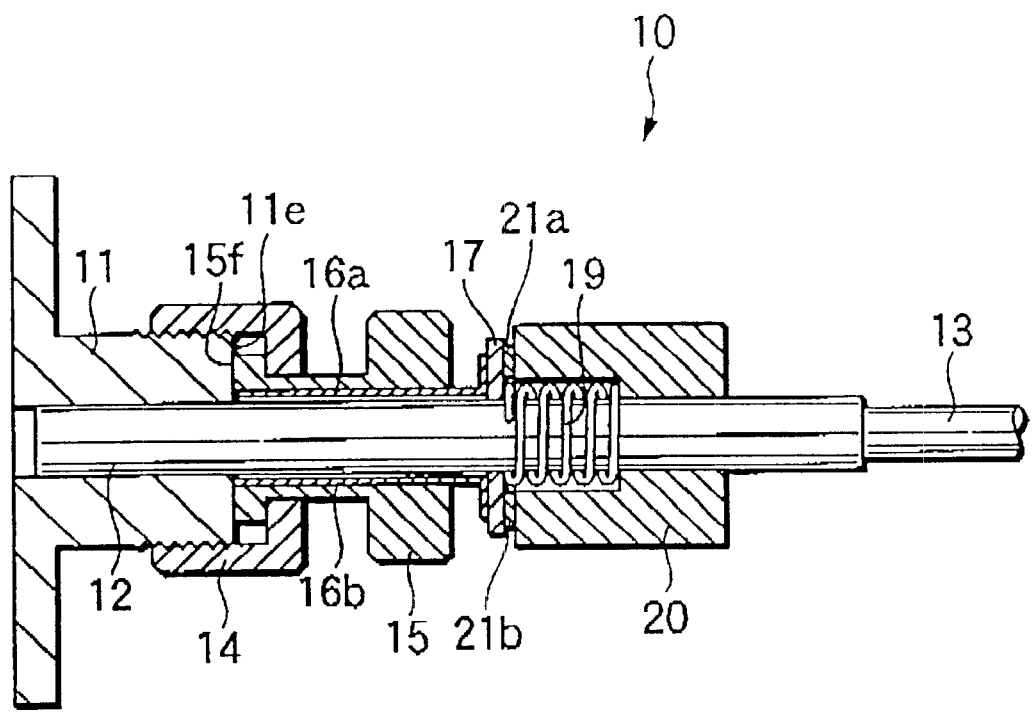
FIG. 5 is a cross-sectional view of a connector with connection detection function according to a second embodiment of the invention.

FIG. 5 shows a connector with connection detection function according to a second embodiment of the present invention. In this embodiment, at the distal end of a spring retaining member 20, the there are provided two proximity switches 21a and 21b spaced from each other at an equal interval in a circumferential direction. The other construction, not described above, is similar to that of the connector 10 with the connection detection function shown in FIGS. 1 to 4, and the same parts as the above-mentioned embodiment are given the same designations and thus the description thereof is omitted. As mentioned the above, the two proximity switches are provided, and only when both of the proximity switches are turned into the conducting state, a lamp (not shown), associated with these switches, is lighted, and therefore the fact that the optical connector 10 has been properly connected to the optical receptacle 11 can be detected. Thus, with this construction, there can be detected whether or not a sensing member 17 and the spring retaining member 20 provided with the proximity switches 21a and 21b are contacted with each other without substantial inclination and in a balanced manner. That is, when a straight line defined by connecting two proximity switches 21a and 21b is substantially inclined from a plane intersected perpendicular to the axial direction of the connector 10, the lamp associated with these switches 21a and 21b are never turned on, because both of switches do not contact with the sensing member 17. Accordingly, there can be detected whether or not the connector 10 and the receptacle 11 are connected with good accuracy.

In this embodiment, although the two proximity switches are provided, three or more proximity switches may be provided, so that there can be detected whether or not the sensing member and the proximity switches are connected each other without substantially inclination and in a balanced manner with respect to the axial of the connector 10 as a center in a plurality of directions.

Figure 6A:
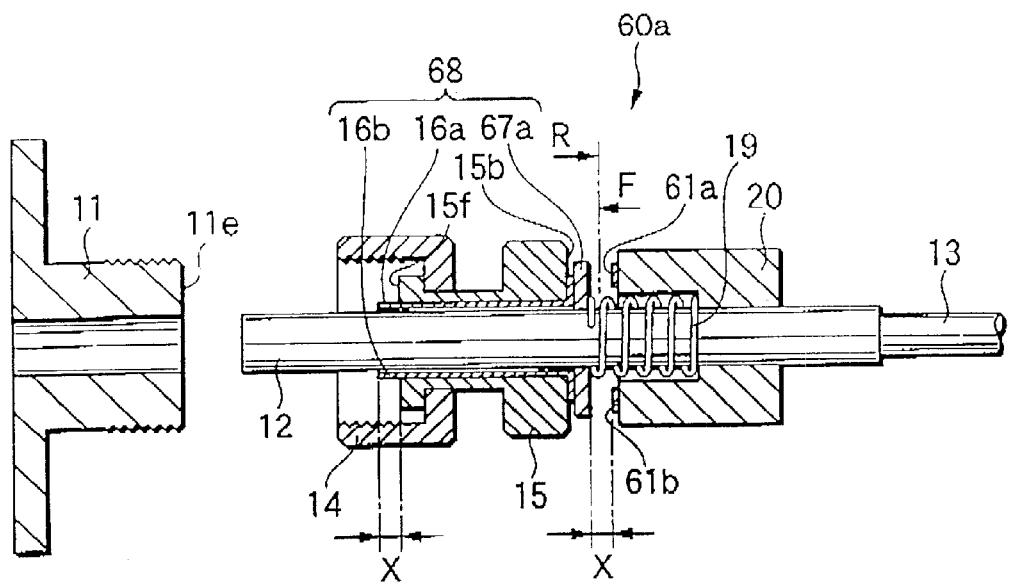
FIG. 6A is a cross-sectional view of a connector with connection detection function according to a third embodiment of the invention.
Figure 6B:
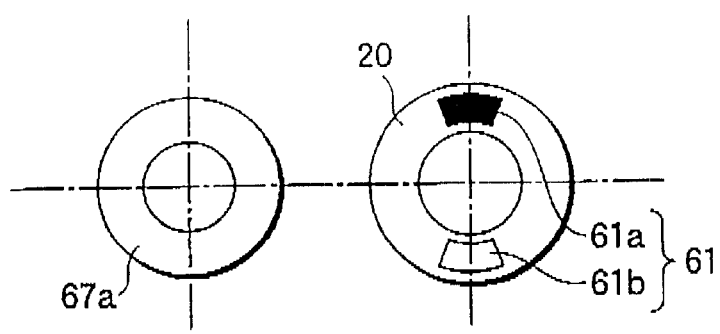
FIG. 6B is a plan view of a sensing member of the connector with the connection detection function of FIG. 6A.

FIGS. 6A and 6B show a connector with a connection detection function according to a third embodiment of the present invention. This embodiment differs from the above embodiment in that a switch is formed by a sensing member 67a forming a moving member 68 and a contact portion 61 (a positive-electrode conductor contact 61a and a negative-electrode conductor contact 61b).

FIG. 6A shows a cross-sectional view of the connector 60a with connection detection function. The sensing member 67a is composed of a conductor, that is, is conductor piece.

The positive-electrode conductor contact 61a and the negative-electrode conductor contact 61b are provided on that end of the spring retaining member 20 opposed to the sensing member 67a. A power source (not shown) is connected to these conductor contacts 61a and 61b. The contact portion 61 and the spring retaining member 20 are electrically insulated.

The distal end portions of the slide pins 16a and 16b project a predetermined distance X from a distal end surface 15f of a nut retaining member 15, so that the sensing member 67a can come into contact with both of the positive-electrode conductor contact 61a and the negative-electrode conductor contact 61b when the connector 60a and the receptacle 11 are fitted with each other, and then are brought into an allowable range of the properly-connected condition.

FIG. 6B is a plan view of the sensing member 67a as seen from a direction F, and also is a plan view of the contact portion 61 as seen from a direction R. The surface of the sensing member 67a is formed by a conductive member. The contact portion 61 comprises the positive-electrode conductor contact 61a and the negative-electrode conductor contact 61b disposed respectively at diametrically-opposite portions of the end surface of the annular spring retaining member 20.

With this construction, when the slide pins 16a and 16b are pushed toward the spring retaining member 20, this sensing member 67a is brought into contact with the positive-electrode conductor contact 61a and the negative-electrode conductor contact 61b. Therefore, a voltage is applied from the positive-electrode conductor contact 61a to the negative-electrode conductor contact 61b through the sensing member 67a by the power source (not shown), so that the positive-electrode conductor contact 61a and the negative-electrode conductor contact 61b are electrically connected together. As a result, the switch is turned into the conducting state, so that the fact that the connector 60a has been properly connected to the optical receptacle 11 is detected. The other construction and operation, not described above, are similar to these of the conductor 10 with the connection detection function showing in FIGS. 1 to 4.

Figure 7A:
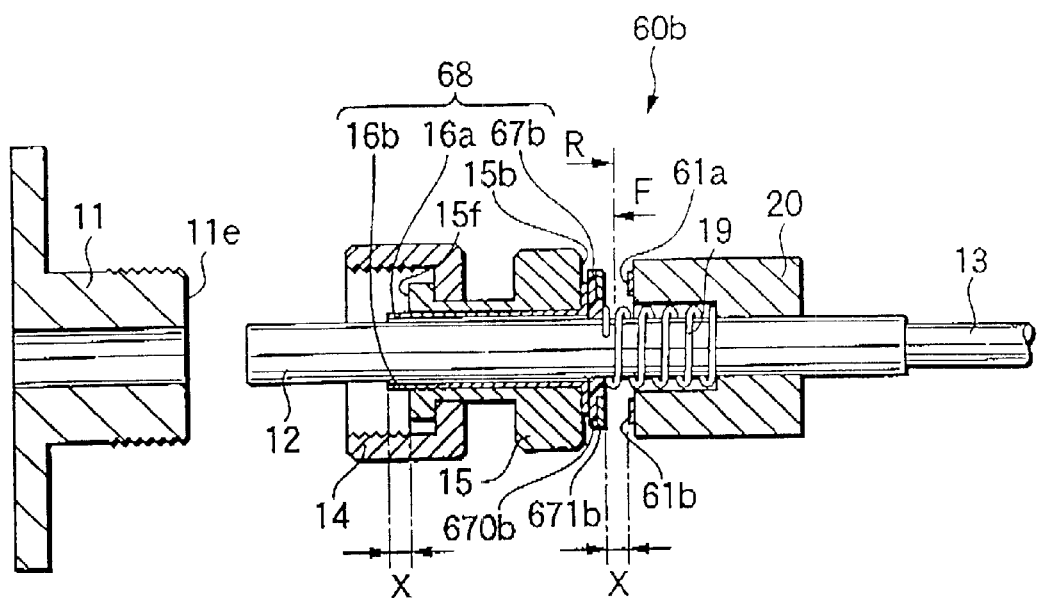
FIG. 7A is a cross-sectional view of a modified connector with connection detection function of FIG. 6A.
Figure 7B:
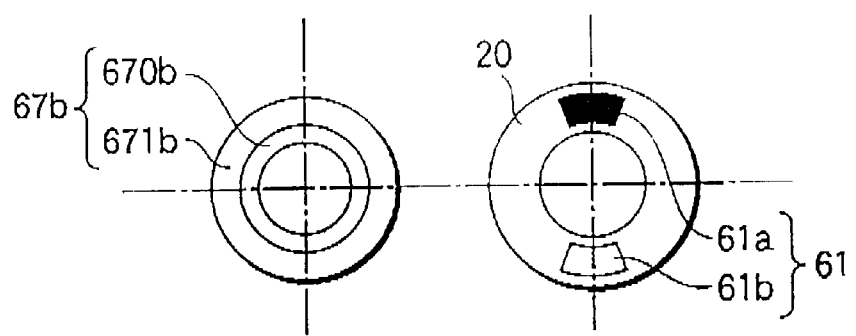
FIG. 7B is a plan view of a sensing member of the connector with the connection detection function of FIG. 7A.

FIGS 7A and 7D show a connector 60b with a connection detection function having a modified form of the above sensing member. A sensing member 67b, shown in FIG. 7B which is a plan view as seen from a direction F of FIG. 7A, comprises an insulating portion 670b formed of an insulating member of an annular shape, and an electrically-conductive member (conductor piece) 671b which is provided at part of a surface of this insulating member. The electrically-conductive member 671b, in the form of a conductor piece, is provided on an outer peripheral portion of the sensing member 67b, disposed radially outwardly of a generally radially-central portion thereof, over an entire circumference thereof. This electrically-conductive member 671b is provided on that surface of the sensing member 67b facing a contact portion 61 mounted on a spring retaining member 20. A coil spring 19 can come into contact with only the insulating portion 670b of the sensing member 67b. The spring retaining member 20 and the contact portion 61 provided at the spring retaining member 20 are electrically insulated to each other. Therefore, the switch of the connector is satisfactorily electrically insulated from the other members of the connector (the spring retaining member 20, the coil spring 19, the sleeve 12, etc.). Namely, when the switch is turned into the conducting state, electricity is prevented from flowing to an optical receptacle 11, thereby preventing an optical equipment, connected to the optical receptacle 11, from being adversely affected.

With this construction of the sensing member 67b, a similar operation is effected as described above for the connector 60a with the connection detection function.

Figure 8A:
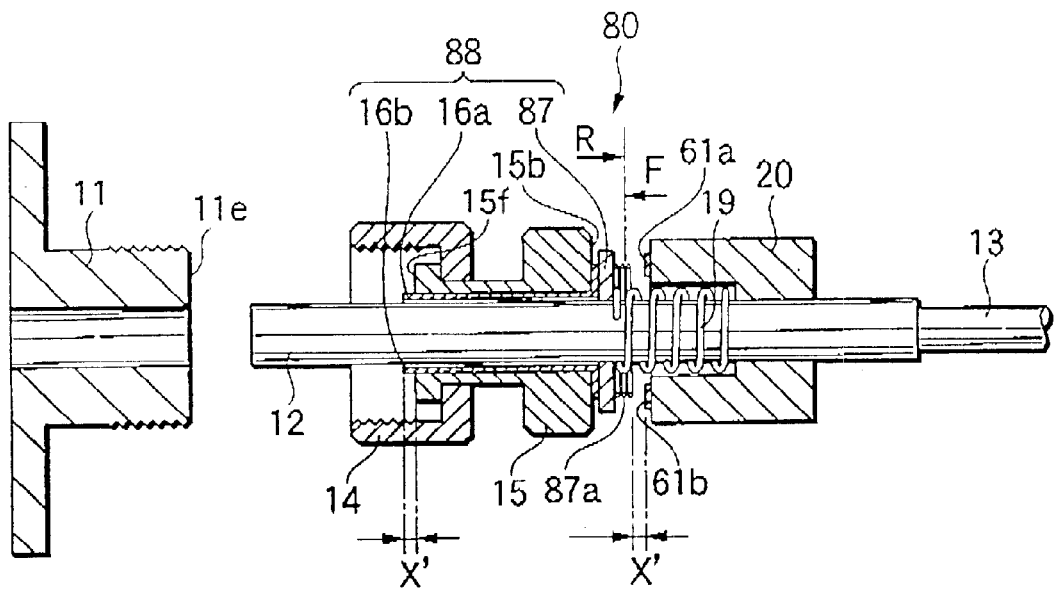
FIG. 8A is a cross-sectional view of a connector with connection detection function according to a fourth embodiment of the invention.
Figure 8B:
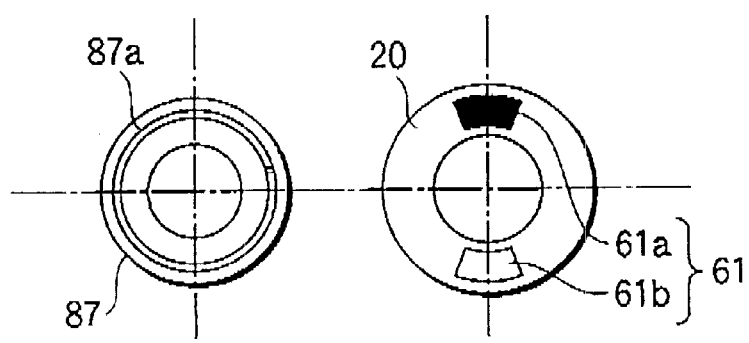
FIG. 8B is a plan view of a sensing member of the connector with the connection detection function of FIG. 8A.

FIGS. 8A and 8B show a connector 80 with a connection detection function according to a fourth embodiment of the present invention. This embodiment differs from the above embodiments in a sensing member 87 forming a moving member 88 and a contact portion 61.

As shown in FIG. 8A, the annular sensing member 87 comprises a coaxially-arranged coil spring (conductor piece) 87a, which comprises an annular conductor and is mounted on that surface of the sensing member 87 opposed to a spring retaining member 20. The coil spring 87a is provided not to contact with the coil spring 19 and a sleeve 12. A positive-electrode conductor contact 61a and a negative-electrode conductor contact 61b, each comprising a conductor, are mounted on that end of the spring retaining member 20 opposed to the sensing member 87. A power source (not shown) is connected to these conductor contacts 61a and 61b.

The distal end portions of the slide pins 16a and 16b project a predetermined distance X' from a distal end surface 15f of a nut retaining member 15, so that the coil spring 87a can come into contact with both of the positive-electrode conductor contact 61a and the negative-electrode conductor contact 61b when the connector 80 and the receptacle 11 are fitted with each other, and then are brought intro an allowable range of the properly-connected condition.

FIG. 8B is a plan view of the sensing member 87 as seen from a direction F, and also is a plan view of the contact portion 61 as seen from a direction R. The coaxially-arranged coil spring 87a, comprising the annular conductor, is mounted on the surface of the annular sensing member 87. The contact portion 6 mounted on the end surface of the spring retaining member 20 comprises the positive-electrode conductor contact 61a and the negative-electrode conductor contact 61b disposed respectively at diametrically-opposite portions of the annular spring retaining member 20.

Figure 8C:
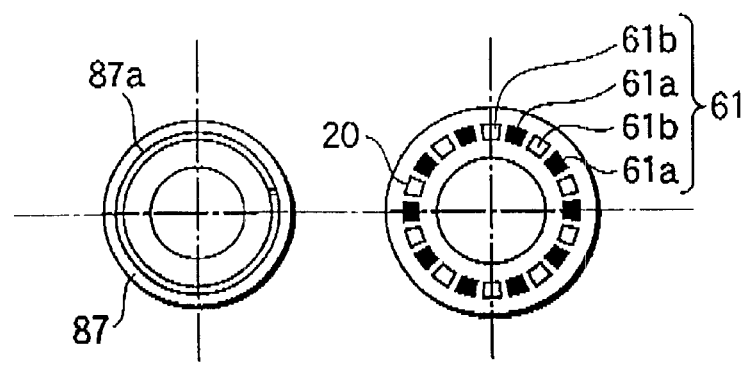
FIG. 8C is a plan view of a modified sensing member of the connector with the connection detection function of FIG. 8B.

FIG. 8C is a plan view of the sensing member 87 as seen from a direction F, and also is a plan view of a modified contact portion 61 (different from the contact portion 61 of FIG. 8B), as seen from a direction R. The contact portion 61, mounted on the end surface of the spring retaining member 20, comprises positive-electrode conductor contacts 61a and negative-electrode conductor contacts 61b which are arranged alternately on the end surface of the annular spring retaining member 20 in the circumferential direction in this embodiment, there are provided ten (10) positive-electrode conductor contacts 61a and ten (10) negative-electrode conductor contacts 61b.

In she sensing member 87 and the contact portion 61 of the above construction, the conductive portion of the sensing member 87 is formed by the coil spring 87a, and the coil has play width in a compression direction in its natural state. Therefore, even when the contact portion 61 and the sensing member 87 are not disposed in parallel relation to each other with high accuracy, the play width of the coil spring 87a compensates for this deviation. Thus when the switch is operated, the good conducting state thereof can be secured. In the switch shown in FIG. 8C, the plurality of positive-electrode conductor contacts 61a and the plurality of negative-electrode conductor contacts 61b are arranged alternately, and therefore the sensitivity of the switch is enhanced.

The other construction and operation, not described above, are similar to those of the connector 10 with he connection detection function shown in FIGS. 1 to 4.

In this embodiment, the sensing member 87 may be formed by the insulating member, so that the contact portion 61 and coil spring 87a are electrically insulated from the other members of the connector. Therefore the switch of the connector is satisfactorily electrically insulated from the other members of the connector even if the switch is tuned into the conducting state. Namely, when the switch is turned into the conducting state, electricity is prevented from flowing to an optical receptacle 11, thereby preventing an optical equipment, connected to the optical receptacle 11, from being adversely affected.

Figure 9A:
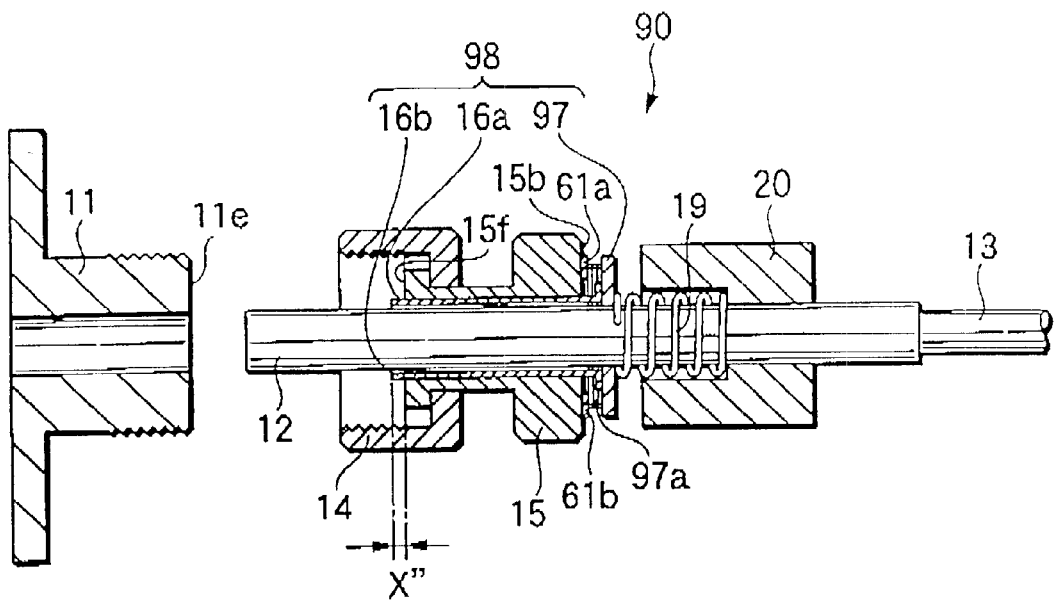
FIG. 9A is a cross-sectional view of a connector with connection detection function according to a fifth embodiment of the invention.
Figure 9B:
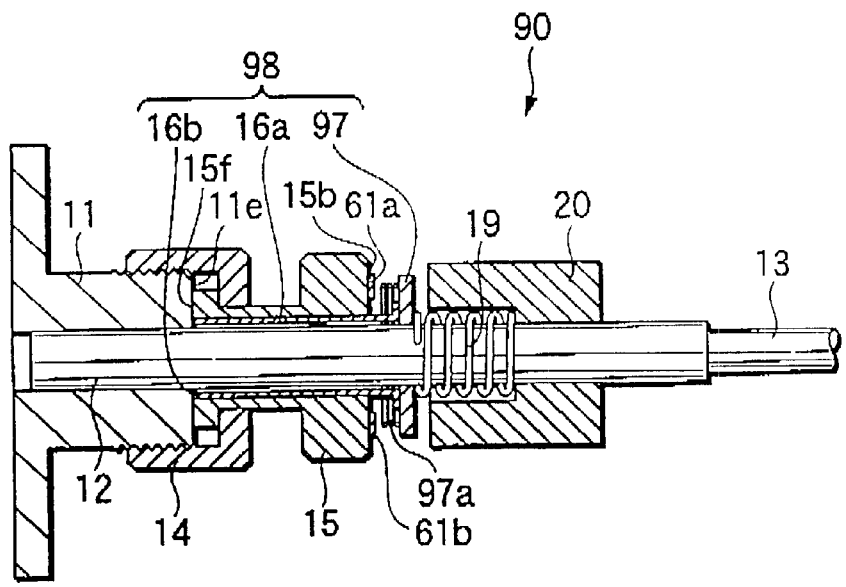
FIG. 9B is a view showing a condition in which the connector of the fifth embodiment is connected to a receptacle.

FIGS. 9A and 9B show a connector with a connection detection function according to a fifth embodiment of the invention. This embodiment differs from the above embodiments in a sensing member 97 forming a moving member 98 and a contact portion 61.

As shown in FIG. 9A, in the connector 90 with the connection detection function, the contact portion 61 is provided on a proximal end surface 15b of a nut retaining member 15 opposed to a spring retaining member 20. The annular sensing member 97, mounted on the proximal ends of slide pins 16a and 16b, is interposed between the nut retaining member 15 and the spring retaining member 20. This sensing member 97 is movable together with the slide pins 16a and 16b. A coaxially-arranged coil spring (conductor piece) 97a, comprising an annular conductor, is mounted on that surface of the sensing member 97 facing the nut retaining member 15 so that it is disposed outside the outer peripheral surfaces of the slide pins 16a and 16b. A coil spring 19 is abutted against that surface of the sensing member 97, facing the spring retaining member 20, and normally urges the sensing member 97 toward the nut retaining member 15. Namely, when the connector 90 is not connected to an optical receptacle 11, the contact portion 61 and the coil spring 97a are contacted with each other and therefore the contact portion 61 is always in the conducting state.

The distal end portions of the slide pins 16a and 16b project a predetermined distance X" from a distal end surface 15f of a nut retaining member 15, so that the coil spring 97a can come into contact with both of the positive-electrode conductor contact 61a and the negative-electrode conductor contact 61b when the connector 90 and the receptacle 11 are fitted with each other, and then are brought intro an allowable range of the properly-connected condition.

When the connector 90 is connected to the optical receptacle 11 as shown in FIG. 9B, the slide pins 16a and 16b push the sensing member 97 toward the spring retaining member 20 against the bias of the coil spring 19, and as a result the coil spring 97a is moved apart from the contact portion 61, so that the conducting state of the switch is canceled.

In the connector 90 with the connection detection function of the above construction, when the connector 90 is properly connected to the optical receptacle 11, the connector 90 and the optical receptacle 11 are satisfactorily kept electrically insulated from each other. Namely, when the connector 90 is connected to the optical receptacle 11, the conducting state of the switch is canceled, and electricity is not flowed to the connector 90, and therefore the optical receptacle 11, and an apparatus (not shown) including the optical receptacle 11 will not be electrified.

The contact portion 61 and the nut retaining member 15 maybe electrically insulated, the sensing member 97 may be formed of the insulating member, and the coil spring 97a and slide pins 16a, 16b may be provided on the sensing member 97 spacing from each other, so that the contact portion 61 and the coil spring 97a are electrically insulted form the other members of the connector. In this case, the switch of the connector is satisfactorily electrically insulated from the other members of the connector even if the switch is tuned into the conducting state. Namely, when the switch is turned into the conducting state, electricity is prevented from flowing to an optical receptacle 11, thereby preventing an optical equipment, connected to the optical receptacle 11, from being adversely affected.

The other construction and operation, not described above, are similar to those of the connector 10 with the connection detection function shown in FIGS. 1 to 4.

In the embodiment, the switch, which is formed with the contact portion 61 (positive-electrode conductor contact 61a and negative-electrode conductor contact 61b), and the sensing member 97 and the coil spring 97a facing to the contact portion 61, may be replaced with the other switches in the above-mentioned embodiments.

Note that although the connector with the connection detection function which is adapted to an optical fiber cable is explained in the above-mentioned embodiments, the connector according to the present invention is not limited to be used for such cable. The connector according to the present invention can be used for any kinds of a longitudinally extending member such as cable, pipe, tube or the like. Particularly, in the case where the connector is adapted to a connection between a flexible pipe and a receptacle of a gas fun heater, it is possible to prevent the gas from leaking effectively.

Next, an optical fiber cable with connection detection function of the present invention will be described with reference to FIG. 10. The optical fiber cable 101 is an optical fiber cable with the connection detection function for transferring a laser beam used for laser machining or others. The optical fiber cable 101 has optical connectors 102 and 103 to which an outgoing lens system 109 and a laser beam source 108 are adapted to be connected, respectively. The optical fiber cable 101 includes a hollow outer tube 105, the optical connectors 102 and 103, a reinforcing tube 106, and a conduction confirmation mechanism 104. The hollow outer tube 105 contains an optical fiber therein. The optical connectors 102 and 103 are mounted respectively at opposite ends thereof. The reinforcing tube 106 extends in a branching manner from a branch portion 107 of the outer tube 105 disposed intermediate opposite ends thereof. The conduction confirmation mechanism 104 is connected to a distal end of the reinforcing tube 106, and has light emitting element 104L. The above-mentioned connectors with the connection detection function are used as the optical connectors 102 and 103.

The conduction confirmation mechanism 104 is provided for confirming whether the connection of the optical connector 102 to an optical receptacle 1011 (provided at the outgoing lens system 109) and the connection of the optical connector 103 to an optical receptacle 1010 (provided at the laser beam source 108) have been properly effected. In this embodiment, the confirmation mechanism 104 is provided with the light emitting element 104L.

Figure 11:
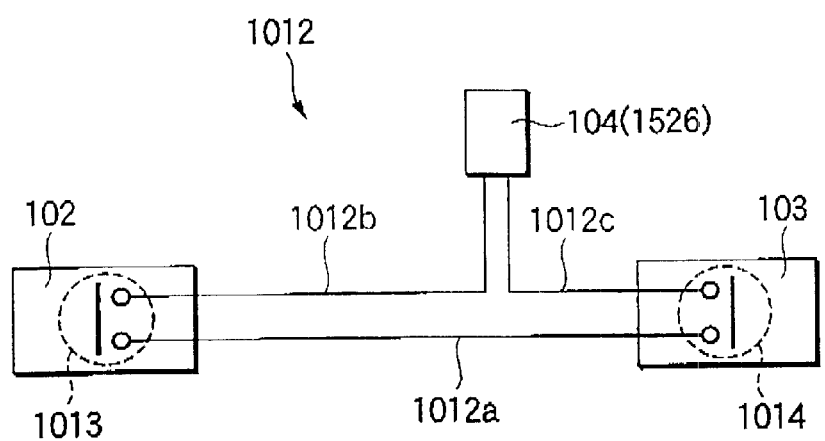
FIG. 11 is a view showing the arrangement of conductor wires received within the optical fiber cable with the connection detection function of FIG. 10.

As shown in FIG. 11, the confirmation mechanism 104 is connected to a switch 1013 of the optical connector 102 by a conductor wire 1012b, and is also connected to a switch 1014 of the optical connector 103 by a conductor wire 1012c. The switches 1013 and 1014 are connected together by a conductor wire 1012a. Thus, the confirmation mechanism 104, the switch 1013 and the switch 1014 are connected together to form a loop-like electric wiring 1012.

Figure 10:
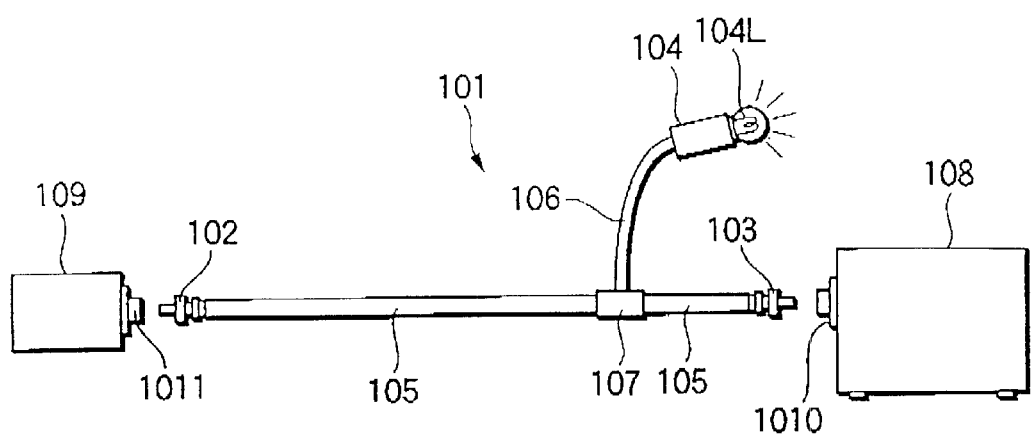
FIG. 10 is a plan view of an optical fiber cable with connection detection function having a conduction confirmation mechanism 104.

The conductor wires 1012a, 1012b and 1012c, together with the optical fiber, are received within the outer tube 105 shown in FIG. 10. The other end of the conductor wire 1012b connected to the switch 1013, and the other end of the conductor wire 1012c connected to the switch 1014 are drawn out of the outer tube 105 through the branch portion 107, provided at the intermediate portion of the outer tube 105, and are connected to the confirmation mechanism 104. Those portions of the conductor wires 1012b and 1012c, drawn out of the outer tube 107, are covered with the reinforcing tube 106.

Figure 12:
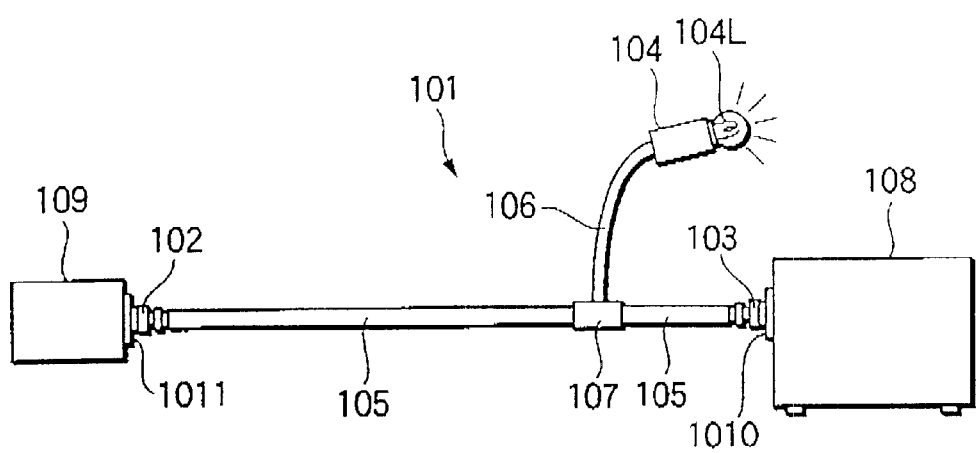
FIG. 12 is a view showing a condition in which the optical fiber cable with the connection detection function of FIG. 10 is properly connected.

FIG. 12 shows a condition in which the optical fiber cable 101 is properly connected to the laser beam source 108 and the outgoing lens system 109. The optical connector 102 is properly connected to the optical receptacle 1011, and also the optical connector 103 is properly connected to the optical receptacle 1010, and therefore the switches 1013 and 1014 of the optical connectors 102 and 103 are turned into the conducting state. As a result, the loop-like electric wiring 1012, shown in FIG. 12, is rendered conductive, so that the light emitting element 104L of the confirmation mechanism 104, associated with this electric wiring, is lighted. Therefore it can be confirmed that the opposite ends of the optical fiber cable 101 have been properly connected.

In this embodiment, although the confirmation mechanism 104 is branched off from the intermediate portion of the outer tube 105, this mechanism 104 may be branched off from one of the optical connectors provided respectively at the opposite ends of the optical connector.

In this embodiment, although the confirmation mechanism 104 is provided with the light emitting element 104L, a sign sound, a monitor display, etc., which can confirm the conducting state, can be used.

Figure 13:
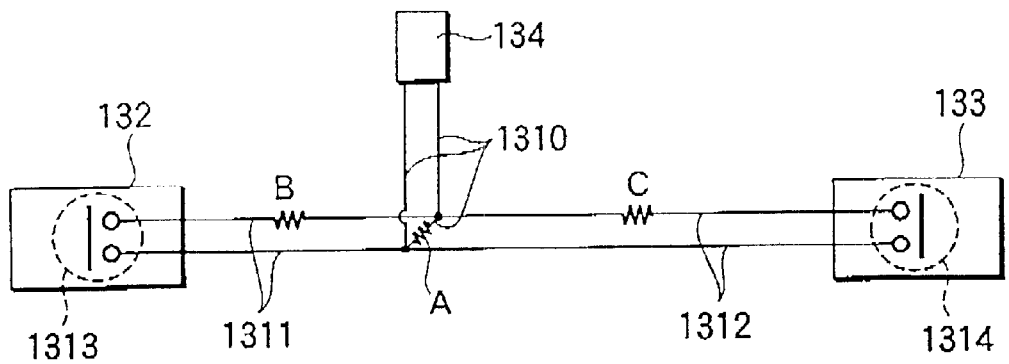
FIG. 13 is a plan view of an optical fiber cable with connection detection function having an outputting member 134.

Next, a modified optical fiber cable with connection detection function of the invention will be described with reference to FIG. 13. The optical fiber cable is provided with an outputting member 134 for confirming whether the connection of an optical connector 132 to an optical receptacle (provided at an outgoing lens system) and the connection of an optical connector 133 to an optical receptacle (provided at a laser oscillator) have been properly effected.

The outputting member 134 is connected to a loop-like first electric wiring 1310 which is normally in a conducting state. A loop-like second electric wiring 1311 normally in a non-conducting state is connected in parallel with the first electric wiring (comprising conductor wires). A loop-like third electric wiring 1312 normally in a non-conducting state is connected in parallel with the first electric wiring. These first, second and third electric wirings, together with an optical fiber, are received within an outer tube. Resistors A, B and C are provided at the electric wirings 1310, 1311 and 1312, respectively. The second electric wiring 1311 is connected to a proximity switch 1313, and the third electric wiring 1312 is connected to a proximity switch 1314 The other ends of the second and third electric wirings 1331 and 1312 are drawn out of the outer tube through a branch portion, provided intermediate the opposite ends thereof, and are connected to the outputting member 134. The above-mentioned connectors with the connection detection function can be used as the optical connectors 132 and 133.

In the optical fiber cable provided with the outputting member 134 of the above construction, the first electric wiring 1310 is connected to a power source (not shown), and a voltage is applied to the first electric wiring 1310, and a resistance value is measured by the outputting member 134 By doing so, the connected condition of the optical connectors can be confirmed.

More specifically, (1) when the optical connectors, connected respectively to the second and third electric wirings, are properly connected to the receptacles, respectively, the following resistance $R_1$ is measured at the outputting member 134.

$$R_1 = A \cdot B \cdot C / (A \cdot B + A \cdot C + B \cdot C)$$

(2) when only the optical connector, connected to the second electric wiring, is disconnected from the receptacle, the following resistance $R_2$ is measured at the outputting member 134.

$$R_2 = A \cdot C / (A + C)$$

(3) When only the optical connector, connected to the third electric wiring, is disconnected from the receptacle, the following resistance $R_3$ is measures at the outputting member 134.

$$R_1 = A \cdot B / (A + B)$$

(4) When the optical connectors, connected respectively to the second and third electric wirings, are both disconnected from the receptacles, respectively, the following resistance $R_4$ is measured at the outputting member 134.

$$R_4 = A$$

In this case, the resistance values of the conductor wires are sufficiently smaller as compared with the resistances A, B and C, and therefore the resistance values of the conductor wires can be ignored. And besides, the values of the resistances B and C are different from each other so that the values of the resistances $R_1$, $R_2$, $R_3$ and $R_4$ are different from each other. Here, the resistance value of the switch portion is omitted in order to simplify the description, although the above-mentioned resistance values $R_1$–$R_4$ should be calculated, taking the resistance value of the switch portion provided at each connector into consideration.

EXAMPLE

As an example, when the values of the resistances A, B and C of the electric wirings are 1 kΩ, 5 kΩ, and 10 kΩ, respectively, the following values of the resistances $R_1$ to $R_4$ are obtained. $R_1 \approx 0.77$ kΩ, $R_2 \approx 0.87$ kΩ, $R_3 \approx 0.83$ kΩ, $R_4 = 1$ kΩ.

Figure 14:
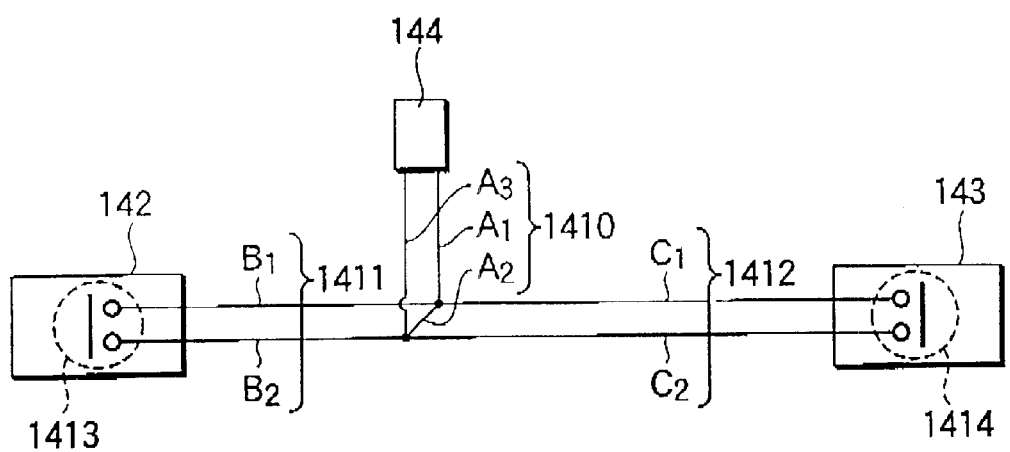
FIG. 14 is a plan view of an optical fiber cable with connection detection function an outputting member 144.

FIG. 14 shows a modified optical fiber cable with connection detection function. The outputting member 144 is provided for confirming whether the connection of an optical connector 142 to an optical receptacle (provided at an outgoing lens system) and the connection of an optical connector 143 to an optical receptacle (provided at a laser oscillator) have been properly effected.

The outputting member 144 comprises conductor wires, and is connected to a loop-like first electric wiring 1410 which is normally in a conducting state. A loop-like second electric wiring 1411 normally in a non-conducting state is connected in parallel with the first electric wiring. A loop-like third electric wiring 1412 normally in a non-conducting state is connected in parallel with the first electric wiring. These first, second and third electric wirings, together with an optical fiber, are received within an outer tube. The electric wiring 1410, 1411 and 1412 each comprises conductor wires of different lengths. More specifically, the first electric wiring 1410 comprises the conductor wires having their respective lengths $A_1$, $A_2$ and $A_3$, and the second electric wiring 1411 comprises the conductor wires having their respective lengths $B_1$ and $B_2$, and the third electric wiring 1412 comprises the conductor wires having their respective lengths $C_1$ and $C_2$. When a resistance per unit length of the conductor wire is $R_0$, the resistance A' of the first electric wiring 1410 is represented by $R_0 \cdot (A_1+A_2+A_3)$, and the resistance B' of the second electric wiring 1411 is represented by $R_0 \cdot (B_1+B_2)$, and the resistance C' of the third electric wiring 1412 is represented by $R_0 \cdot (C_1+C_2)$. The second electric wiring 1411 is connected to a switch 1413, and the third electric wiring 1412 is connected to a switch 1414. The other ends of the second and third electric wirings 1411 and 1412 are drawn out of the outer tube through a branch portion, provided intermediate the opposite ends thereof, and are connected to the outputting member 144.

In the optical fiber cable provided with the outputting member 144 of the above construction, the first electric wiring is connected to a power source (not shown), and a voltage is applied to the first electric wiring, and a resistance value is measured by the outputting member 144. By doing so, the connected condition of the optical connectors can be confirmed.

More specifically, (1) when the optical connectors, connected respectively to the second and third electric wirings, are properly connected to the receptacles, respectively, the following resistance $R_5$ is measured at the outputting member 144.

$$R_5 = R_0(A_1+A_3) + A_2 \cdot B' \cdot C' \cdot R_0 / (B' \cdot C' + A_2 \cdot C' \cdot R_0 + A_2 \cdot B' \cdot R_0)$$

(2) When only the optical connector, connected to the second electric wiring, is disconnected from the receptacle, the following resistance $R_6$ is measured at the outputting member 144.

$$R_6 = R_0(A_1+A_3) + A_2 \cdot C' \cdot R_0 / (C' + A_2 \cdot R_0)$$

(3) When only the optical connector, connected to the third electric wiring, is disconnected from the receptacle, the following resistance $R_7$ is measured at the outputting member 144.

$$R_7 = R_0(A_1+A_3) + A_2 \cdot B' \cdot R_0 / (B' + A_2 \cdot R_0)$$

(4) When the optical connectors, connected respectively to the second and third electric wirings, are both disconnected from the receptacles, respectively, the following resistance $R_8$ measured at the outputting member 144.

$$R_8 = A'$$

In this case, the values of the resistances B' and C' are different from each other so that the values of the resistances $R_5$, $R_6$, $R_7$ and $R_8$ are different from each other.

EXAMPLE

As an example, the resistance per unit length of the conductor wire is represented by $R_0=1$ $\Omega/m$, and with respect to the first electric wiring, $A_1=0.5$ m, $A_2=0.5$ m and $A_3=0.5$ m are provided, and with respect to the second electric wiring, $B_1=1$ m and $B_2=1$ m are provided, and with respect to the third electric wiring, $C_1=2$ m and $C_2=2$ m are provided.

In this case, with respect to the above resistance values, $R_5 \approx 1.36$ $\Omega$, $R_6 1.44$ $\Omega$, $R_7=1.40$ $\Omega$, and $R_8=1.50\Omega$ are obtained. Here, the resistance value of the switch portion is omitted in order to simplify the description, although the resistance values $\underline{R_5}$–$\underline{R_6}$ should be calculated, taking the resistance value of the switch portion provided at each connector into consideration.

In the optical fiber cable with the connection detection function having the first, second and third electric wirings, in order to change the resistance values of the electric wirings, if the respective electric wirings are provided with respective conductive wires with different resistance values, there can be provided an optical fiber cable which can detect the connected condition of the connector as well as the above-mentioned embodiments.

Figure 15:
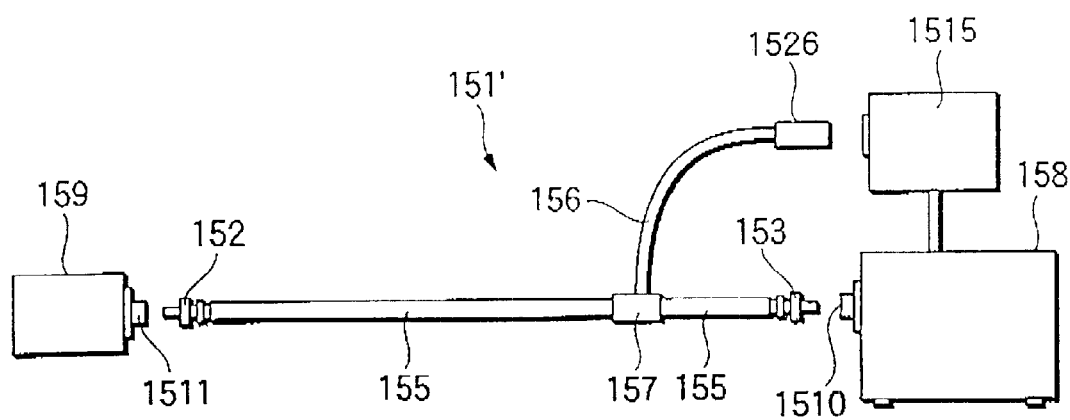
FIG. 15 is a view showing an equipment control mechanism employing an optical fiber cable with connection detection function.
Figure 16:
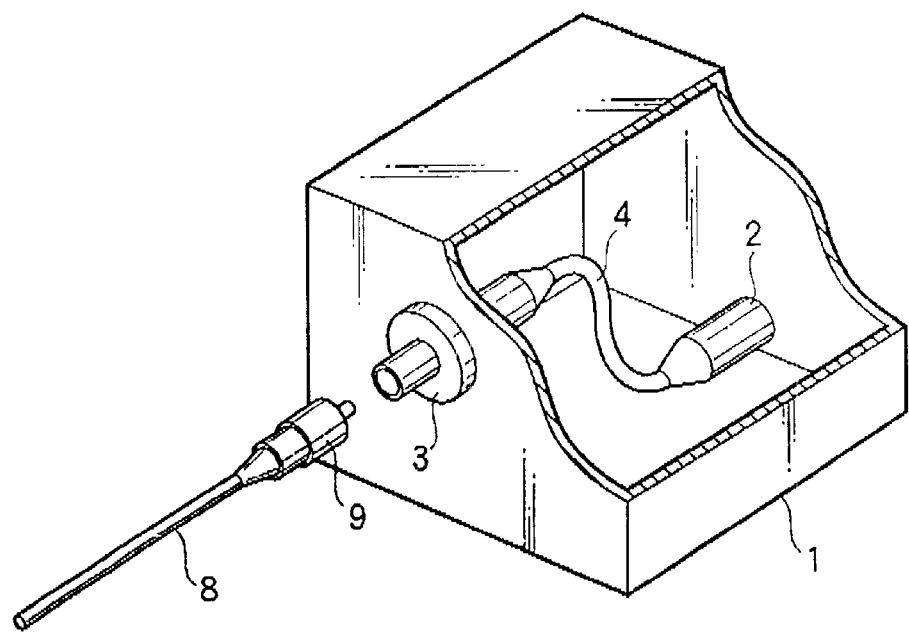
FIG. 16 is a view showing the construction of a conventional connector connection detection mechanism.
Figure 17:
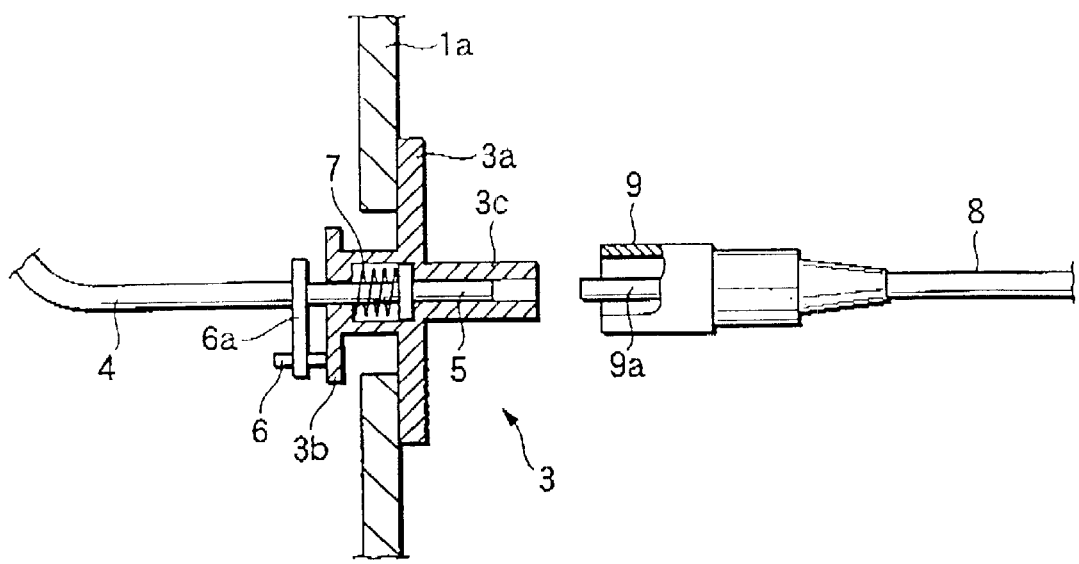
FIG. 17 is a cross-sectional view showing the conventional connector connection detection mechanism before a connector is connected.
Figure 18:
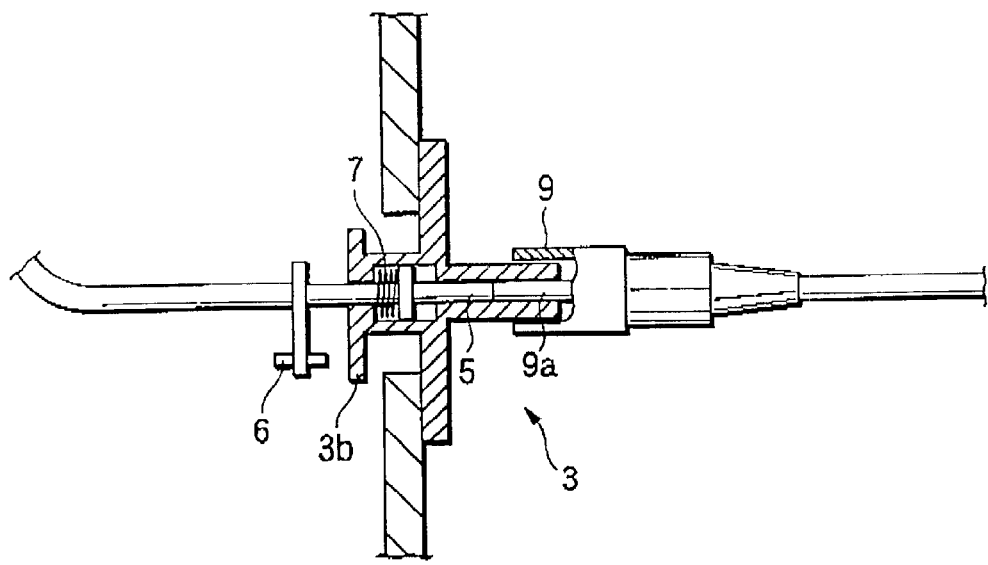
FIG. 18 is a view similar to FIG. 16, but showing a condition after the connector is connected.

Next, an equipment control mechanism, employing an optical fiber cable with the connection detection function of the invention, will be described with reference to FIG. 15. The electric wiring, shown in FIG. 10, is received within the optical fiber cable 151'. Instead of the conduction confirmation mechanism 104 of the optical fiber cable 101 of FIG. 10, a pin connector 1526 is provided as outputting member for obtaining the conduction and non-conduction information. Conductor wires 1012b and 1012c, drawn out through a reinforcing tube 156, are connected to the pin connector 1526. Only when the connection of an optical connector 153 to an optical receptacle 1510 (provided at a laser oscillator 159) and the connection of an optical connector 152 to an optical receptacle 1511 (provided at an outgoing lens system 159) have been properly effected, the electric wiring 1012 is in the conducting state, and the conduction information is outputted from the pin connector 1526. On the other hand, when at least one of the two connections is not proper, the electric wiring 1012 is in the non-conducting state, so that the non-conducting information is outputted from the pin connector 1526.

A control device 1515 is connected to the laser oscillator 158 to effect the control for enabling and disenabling the emission of a laser beam from the laser oscillator 158. The pin connector 1526 of the optical fiber cable 151' is connected to the control device 1515, and in accordance with the conduction and non-conduction information, the control device 1515 enables and disenables the emission of a laser beam from the laser oscillator 158.

When the optical fiber cable 151' is not properly connected to at least one of the laser oscillator 158 and the outgoing lens system 159, the electric wiring 1012 of the optical fiber cable 151' is in the non-conducting state, so that the non-conducting information is fed from the pin connector 1526 to the control device 1515. In response to this information, the control device 1515 disenables the emission of a laser beam from the laser oscillator 158. On the other hand, when the optical fiber cable 151' is properly connected to both of the laser oscillator 158 and the outgoing lens system 159, the electric wiring 1012 of the optical fiber cable 151' is in the conducting state, so that the conducting-information is fed from the pin connector 1526 to the control device 1515. In response to this information, the control device 1515 enables the laser oscillator 158 to emit a laser beam. Here, when at least one of the connection between the optical connector 153 and the optical receptacle 151C and the connection between the optical connector 152 and the optical receptacle 1511 is broken or becomes loose during the emission of a laser beam from the laser oscillator 158, so that the properly-connected condition is not maintained, the electric wiring 1012 is turned into the non-conducing state, and the non-conducting information is fed from the pin connector 152 to the control device 1515, so that the emission of a laser beam from the laser oscillator 158 is forcibly stopped. Therefore, leakage of the laser beam is prevented, and the safety of the nearby workers is secured.

In this embodiment, although the control device 1515 is separate from the laser oscillator 158, the laser oscillator 158 maybe incorporated in the control device 1515. And, although the optical fiber cable of FIG. 10 is used, the optical fiber cables of FIGS. 13 and 14 may be used.

As described above, with the use of the equipment control mechanism employing the optical fiber cable with the connection detection function, the control for enabling and disenabling the emission of the laser beam from the laser oscillator can be effected after the connected conditions of the connectors at the opposite ends of the optical fiber cable are detected.

By mounting the connector with the connection detection function of the invention on the optical fiber, the connector connection detection mechanism can be easily added to an equipment not provided with such a detection mechanism. And besides, when introducing a detection mechanism into an equipment, it has heretofore been necessary to replace the already-installed equipment with an equipment beforehand provided with the detection mechanism or to add extensive modifications to the already-installed equipment. However, with the use of the connector of the invention, the already-installed equipment can be used as it is, and therefore the cost is not wasted, and this is very advantageous from an economical point of view.

What is claimed is:

1. A connector with a connection detection function, said connector being adapted to be connected to a fixed receptacle and comprising:

a body in which a longitudinally extending member is centrally mounted, said body including an attachment member to be secured to said fixed receptacle, and a retaining member fixedly mounted to said longitudinally extending member and holding said attachment member;

a moving member movable in an axial direction of said connector relative to said body, said moving member including at least one slide pin disposed in a gap between said longitudinally extending member and said retaining member, and a sensing member fixedly secured to a proximal end of said slide pin; and a switch that can be changed between an electrical conducting state and an electrical non-conducting state in response to contact with said sensing member due to movement of said moving member when said connector is properly fitted onto said fixed receptacle, to thereby detect a proper connection between said connector and said fixed receptacle.

2. The connector according claim 1, wherein said switch is electrically insulated from said fixed receptacle when said connector comes into contact with said fixed receptacle.

3. The connector according claim 1, wherein the switch is changed from the electrical non-conducting state to the electrical conducting state only when said connector is properly fitted to said fixed receptacle.

4. The connector according claim 1, wherein the switch is changed from the electrical conducting state to the electrical non-conducting state only when said connector is properly fitted to said fixed receptacle.

5. The connector according claim 1, wherein said switch comprises a contact portion having a positive contact and a negative contact; and said sensing member comprises a conductor piece movable relative to said contact portion, wherein said contact portion and said conductor piece are brought in contact with each other by the movement of said moving member when said connector is properly fitted to said fixed receptacle.

6. The connector according claim 5, wherein said conductor piece comprises a coil spring.

7. The connector according claim 1, wherein said switch comprises a proximity switch.

8. The connector according to any one of claims 1–7, wherein said longitudinally extending member comprises a ferrule surrounding an optical fiber cable.

9. An optical fiber cable with a connection detection function comprising:

a pair of connectors mounted on opposite ends of an optical fiber and adapted to be connected to respective fixed receptacles, each of said connectors including,
   a body on which the optical fiber is mounted,
   a moving member movable in an axial direction of said connector relative to said body, and
   a switch that can be changed between an electrical conducting state and an electrical non-conducting state in response to the movement of said moving member when said connector is properly fitted onto said fixed receptacle; and a loop-shaped electric wiring extended along said optical fiber and linked through said switch to each of said connectors, wherein said loop-shaped electric wiring is normally maintained in a non-conducting state, further said loop-shaped electric wiring is changed from the non-conducting state to a conducting state when both of said connectors are properly connected to said respective fixed receptacles.

10. The optical fiber cable according to claim 9, further comprising:

a conduction confirmation member linked to said loop-shaped electric wiring, said conduction confirmation member providing a visual indication confirming the conducting and non-conducting states of said loop-shaped electric wiring.

11. The optical fiber cable according to claim 9, further comprising:

an outputting member linked to said loop-shaped electric wiring, said output member outputting information regarding the conducting and non-conducting states of said loop-shaped electric wiring.

12. An optical fiber cable with a connection detection function, comprising:

a pair of connectors mounted on opposite ends of an optical fiber and adapted to be connected to a pair of fixed receptacles respectively, each of said connectors including,
    a body on which the optical fiber is mounted,
    a moving member movable in an axial direction of said connector relative to said body, and
    a switch that can be changed between an electrical conducting state and an electrical non-conducting state in response to the movement of said moving member when said connector is properly fitted onto said fixed receptacle; and a loop-shaped electric wiring extended along said optical fiber and linked through said switch to each of said connectors, wherein said loop-shaped electric wiring is normally maintained in a conducting state, further said loop-shaped electric wiring is changed from the conducting state to a non-conducting state when both of said connectors are properly connected to said respective fixed receptacles.

13. The optical fiber cable according to claim 12, further comprising:
a conduction confirmation member linked to said loop-shaped electric wiring, said conduction confirmation member providing a visual indication confirming the conducting and non-conducting states of said loop-shaped electric wiring.

14. The optical fiber cable according to claim 12, further comprising:
an outputting member linked to said loop-shaped electric wiring, said output member outputting information regarding the conducting and non-conducting states of said loop-shaped electric wiring.

15. An optical fiber able with a connection detection function comprising:
a first connector mounted on one end of an optical fiber and adapted to be connected to a first receptacle;
a second connector mounted on the other end of said optical fiber and adapted to be connected to a second receptacle;
a first loop-shaped electric wiring normally maintained in a conducting state and having a detector;
a second loop-shaped electric wiring extended through said first connector and normally maintained in a non-conducting state, said second loop-shaped electric wiring being electrically connected in parallel with said first loop-shaped electric wiring; and
a third loop-shaped electric wiring extended through said second connector and normally maintained in a non-conducting state, said third loop-shaped electric wiring being electrically connected in parallel with said first loop-shared electric wiring,
wherein when said first connector is properly connected to said first receptacle, said second loop-shaped electric wiring is changed from the non-conducting state to a conducting state so as to be detected by said detector, and
when said second connector is properly connected to said second receptacle, said third loop-shaped electric wiring is changed from the non-conducting state to a conducting state so as to be detected by said detector.

16. An optical fiber cable with a connection detection function comprising:
a first connector mounted on one end of an optical fiber and adapted to be connected to a first receptacle;
a second connector mounted on the other end of said optical fiber and adapted to be connected to a second receptacle;
a first loop-shaped electric wiring normally maintained in a conducting state and including a detector;
a second loop-shaped electric wiring extended through said first connector and normally maintained in a conducting state, said second loop-shaped electric wiring being electrically connected in parallel with said first loop-shaped electric wiring; and
a third loop-shaped electric wiring extended through said second connector and normally maintained in a conducting state, said third loop-shaped electric wiring being electrically connected in parallel with said first loop-shaped electric wiring,
wherein when said first connector is properly connected to said first receptacle, said second loop-shaped electric wiring is changed from the conducting state to a non-conducting state so as to be detected by said detector, and
when said second connector is properly connected to said second receptacle, said third loop-shaped electric wiring is changed from the conducting state to a non-conducting state so as to be detected by said detector.

17. The optical fiber cable according to claim 15, further comprising:
an outputting member, provided at said first electric wiring, for outputting information regarding the conducting and non-conducting states of said second and third electric wirings.

18. The optical fiber cable according to claim 16, further comprising:
an outputting member, provided at said first electric wiring, for outputting information regarding the conducting and non-conducting states of said second and third electric wirings.

19. The optical fiber cable according to claim 15, wherein said second electric wiring and said third electric wiring are different in resistance value from each other.

20. The optical fiber cable according to claim 16, wherein said second electric wiring and said third electric wiring are different in resistance value from each other.

21. An equipment control mechanism for an optical equipment comprising:
an optical fiber cable as defined in one of claims 9 and 12;
an outputting member provided at said loop-shaped electric wiring for outputting information regarding the conducting and non-conducting of said loop-shaped electric wiring; and
a controller that controls an operation of an optical equipment, which has one of said fixed receptacle which is connected to one of said connectors, in accordance with the information outputted from the outputting member.

22. An equipment control mechanism for an optical equipment comprising:
an optical fiber cable as defined in one of claims 15 and 16;
an outputting member, provided at said first loop-shaped electric wiring, for outputting information regarding the conducting and non-conducting states of said second and third electric wirings; and
a controller that controls an operation of an optical equipment, which has one said fixed receptacle which is connected to said connector in accordance with the information outputted from the outputting member.

23. An equipment control mechanism according to claim 21, wherein said optical equipment is a laser oscillator, and when an incompletely-connected condition of said connector is detected from the information outputted from said outputting member, said laser oscillator is prevented from emitting a laser beam.

24. An equipment control mechanism according to claim 22, wherein said optical equipment is a laser oscillator, and when an incompletely-connected condition of said connector is detected from the information outputted from said outputting member, said laser oscillator is prevented from emitting a laser beam.

25. An equipment control mechanism according to claim 21, wherein said optical equipment is a laser oscillator, and when an incompletely-connected condition of said connector is detected from the information outputted from said outputting member, the operation of said laser oscillator is stopped.

26. An equipment control mechanism according to claim 22, wherein said optical equipment is a laser oscillator, and when an incompletely-connected condition of said connector is detected from the information outputted from said outputting member, the operation of said laser oscillator is stopped.

* * * * *